United States Patent [19]

Zook

[11] Patent Number: 5,737,142

[45] Date of Patent: Apr. 7, 1998

[54] SERVO TRACK ADDRESS CHANNEL CODE FOR PR4 MAGNETIC RECORDING

[75] Inventor: Christopher P. Zook, Longmont, Colo.

[73] Assignee: Cirrus Logic, Inc., Fremont, Calif.

[21] Appl. No.: 414,690

[22] Filed: Mar. 31, 1995

[51] Int. Cl.⁶ .......................... H03M 7/00; H03M 7/04; G11B 5/09
[52] U.S. Cl. .................... 360/49; 360/40; 341/59; 341/97
[58] Field of Search .................. 360/40, 46, 48, 360/51, 49; 341/97, 59

[56] References Cited

U.S. PATENT DOCUMENTS

| | | | |
|---|---|---|---|
| 5,274,510 | 12/1993 | Sugita et al. | 360/49 |
| 5,327,400 | 7/1994 | Fredrickson et al. | 371/43 |
| 5,384,671 | 1/1995 | Fisher | 360/51 |

OTHER PUBLICATIONS

Siegel et al., "Modulation and Coding for Information Storage", IEEE Communications Magazine, Dec. 1991.

*Primary Examiner*—Aristotelis M. Psitos
*Assistant Examiner*—Regina Y. Neal
*Attorney, Agent, or Firm*—Howard H. Sheerin; Dan A. Shifrin

[57] ABSTRACT

A rate 5/7, d=0 channel code encodes a Gray code servo track address into channel data recorded on a magnetic disk; a PR4 sliding threshold Viterbi sequence detector detects the recorded servo track address upon read back; a cost effective d=0 decoder decodes the recorded servo track address into its Gray code representation; and a 1/1+D filter decodes the Gray code track address into its binary representation. Detecting the servo data with a PR4 Viterbi sequence detector, which is already provided in a read channel for detecting user data, increases the data density of the storage system. The cost and complexity of the decoder is reduced by encoding/decoding the Gray code track address in sections of five bits.

7 Claims, 7 Drawing Sheets

| BINARY TRACK NUMBER | PRE PR4 PRECODER | CHANNEL DATA | MAGNETIC FLUX TRANSITIONS |
|---|---|---|---|
| 000 | 110110110 | 010010010 | − − − + + + + + − − − − − − + + + |
| 001 | 110110011 | 010010001 | − − − + + + + + − − − − − − − + |
| 011 | 110011011 | 010001001 | − − − − + + + + + + − − − − − + |
| 010 | 110011110 | 010001010 | − − − − + + + + + + − − − − + + + |
| 110 | 011011110 | 001001010 | − − − − − + + + + + − − − − + + + |
| 111 | 011011011 | 001001001 | − − − − − + + + + + − − − − − + |
| 101 | 011110011 | 001010001 | − − − − − − + + + + − − − − − + |
| 100 | 011110110 | 001010010 | − − − − − − + + + + − − − − + + + |

FIG. 3
(Prior Art)

| BINARY TRACK NUMBER | GRAY CODE | CHANNEL DATA | MAGNETIC FLUX TRANSITIONS | PR4 DATA |
|---|---|---|---|---|
| 00000 | 00000 | 1100100 | − + + − − − − − − + + + + | X010110 |
| 00001 | 00001 | 1100010 | − + + − − − − − − − + + | X010011 |
| 00010 | 00011 | 1101110 | − + + − − − − + + − − + + | X011001 |
| 00011 | 00010 | 1101101 | − + + − − − + + − − − + | X011011 |
| 00100 | 00110 | 1101011 | − + + − − − + + + − − + | X011110 |
| 00101 | 00111 | 1011011 | − + + + − − + + + − − + | X110110 |
| 00110 | 00101 | 1011101 | − + + + − − + + − − − + | X110011 |
| 00111 | 00100 | 1011110 | − + + + − − + + − − + + | X110001 |
| 01000 | 01100 | 1010010 | − + + + − − − − − − + + | X111011 |
| 01001 | 01101 | 1010001 | − + + + − − − − − − − + | X111001 |
| 01010 | 01111 | 1010111 | − + + + − − − + + − − + | X111100 |
| 01011 | 01110 | 1010100 | − + + + − − − + + + + + | X111110 |
| 01100 | 01010 | 1001100 | − + + + + + − − + + + + | X101010 |
| 01101 | 01011 | 1001010 | − + + + + + − − − − + + | X101111 |
| 01110 | 01001 | 1001001 | − + + + + + − − − − − + | X101101 |
| 01111 | 01000 | 1000101 | − + + + + + + + − − + + | X100111 |
| 10000 | 11000 | 1000110 | − + + + + + + − − + + + | X100101 |
| 10001 | 11001 | 0100110 | − − + + + + + − − + + + | X110101 |
| 10010 | 11011 | 0100101 | − − − + + + + + − − − + | X110111 |
| 10011 | 11010 | 0100011 | − − − + + + + + + − − + | X110010 |
| 10100 | 11110 | 0111011 | − − − + + − − + + + − + | X100110 |
| 10101 | 11111 | 0111101 | − − − + + − − + + − − + | X100011 |
| 10110 | 11101 | 0111110 | − − − + + − − + + − + + | X100001 |
| 10111 | 11100 | 0110010 | − − − + + − − − − − + + | X101011 |
| 11000 | 10100 | 0110001 | − − − + + − − − − − − + | X101001 |
| 11001 | 10101 | 0110111 | − − − + + − − − − + + − + | X101100 |
| 11010 | 10111 | 0110100 | − − − + + − − − − + + + + | X101110 |
| 11011 | 10110 | 0101100 | − − − + + + + − − + + + + | X111010 |
| 11100 | 10010 | 0101010 | − − − + + + + − − − + + | X111111 |
| 11101 | 10011 | 0011010 | − − − − + + − − − + + | X010111 |
| 11110 | 10001 | 0010110 | − − − − + + + − − + + | X011101 |
| 11111 | 10000 | 0010101 | − − − − + + + − − − + | X011111 |

FIG. 4

| BINARY TRACK NUMBER | GRAY CODE | | |
|---|---|---|---|
| 000000000000000 | 00000 | 00000 | 00000 |
| 000000000000001 | 00000 | 00000 | 00001 |
| 000000000000010 | 00000 | 00000 | 00011 |
| ⋮ | ⋮ | ⋮ | ⋮ |
| 000000000011101 | 00000 | 00000 | 10011 |
| 000000000011110 | 00000 | 00000 | 10001 |
| 000000000011111 | 00000 | 00000 | 10000 |
| 64→ 000000000100000 | 00000 | 00001 | 10000 |
| 68→ 000000000100001 | 00000 | 00001 | 10001 |
| 000000000100010 | 00000 | 00001 | 10011 |
| ⋮ | ⋮ | ⋮ | ⋮ |
| 000000000111101 | 00000 | 00001 | 00011 |
| 000000000111110 | 00000 | 00001 | 00001 |
| 000000000111111 | 00000 | 00001 | 00000 |
| 70→ 000000001000000 | 00000 | 00011 | 00000 |
| 000000001000001 | 00000 | 00011 | 00001 |
| 000000001000010 | 00000 | 00011 | 00011 |
| ⋮ | ⋮ | ⋮ | ⋮ |
| 000000001011101 | 00000 | 00011 | 10011 |
| 000000001011110 | 00000 | 00011 | 10001 |
| 000000001011111 | 00000 | 00011 | 10000 |
| | | ↑ 66 | ↑ 62 |

FIG. 6

SERVO TRACK ADDRESS CHANNEL CODE FOR PR4 MAGNETIC RECORDING

FIELD OF INVENTION

The present invention relates to magnetic disk storage systems for digital computers, and particularly, to a novel method and apparatus for addressing a plurality of servo tracks recorded on the magnetic disk.

BACKGROUND OF THE INVENTION

In magnetic storage systems for computers, digital data serves to modulate the current in a read/write head coil so that a sequence of corresponding magnetic flux transitions are written onto a magnetic medium in a series of concentric tracks. To read this recorded data, the read/write head passes over the magnetic medium and transduces the magnetic transitions into pulses in an analog signal that alternate in polarity. These pulses are then decoded by read channel circuitry to reproduce the digital data.

The read/write head is normally mounted on an actuator arm which is positioned by means of a DC brushless motor (and typically a voice coil motor ("VCM")). A servo system controls the VCM, and thereby the head position, necessary for reading and writing information in response to requests from a host computer connected to the disk drive. The servo system performs two functions: (1) a "seek" or "access" function in which the servo system moves the head to a selected track; and (2) when the head reaches the selected track, a "track following" or "tracking" function in which it accurately positions the head over a centerline of the track and maintains that position as successive portions of the track pass by the head. Servo control information embedded within the data provides inter-track head position information so that a head position error, indicative of a difference between the actual head position and the desired head position, can be computed. In response to the head position error, the servo control system generates a VCM control signal to align the head over the centerline of the selected track, thereby driving the head position error to zero.

The embedded servo control information recorded on the magnetic disk typically includes a servo track address field for course positioning of the read/write head, and a burst field for fine positioning over a centerline of the selected track. During a seek operation, when the servo controller is moving the read/write head to a new track, the track address identifies the current track passing under the head. The current track address is detected by the read head, decoded by the read channel circuitry, and transmitted to the servo controller. The servo controller compares the current track address with a target track address to generate a track position error. The track position error is converted into an actuator control signal for controlling the velocity of the head as it approaches the target track. Once the read head arrives at the target track, the servo controller switches into a tracking mode and processes the servo burst fields in order to maintain the head over the track's centerline.

As shown in FIGS. 1A and 1B, the servo data 2 is recorded on the magnetic disk 4 as radial spokes of information embedded within the circular tracks. The tracks, arranged from an inner track 6 to an outer track 8, comprise a plurality of sectors 10 for recording user data. As previously described, the servo data 2 includes a track address field 12 and a servo burst field 14. During a seek operation, as the read/write head traverses the magnetic disk toward the target track at a very high speed, a track address might be detected as part of a current track and part of the next adjacent track. Unless adjacent track addresses are different by only one bit, the detected track address will be grossly incorrect. Therefore, the track address cannot be recorded in its direct binary representation since more than one bit would change between adjacent tracks (e.g., track #4=0100 and track #3=0011 might be detected as track #7=0111.)

Normally, a Gray code is used to encode the track address before it is recorded onto the disk to ensure that adjacent addresses differ by only one bit. The Gray code is further encoded to ensure that the recorded channel data of adjacent track addresses differ in only two adjacent bits (i.e., the flux pattern of adjacent track addresses differs in an area equal to the width of one bit cell.) After a track address is detected, it is converted from its Gray code representation back into its binary representation, then subtracted from the target track address to generate the head position error.

In conventional peak detection read channels, analog circuitry, responsive to threshold crossing or derivative information, detects peaks in the continuous time analog read signal. The analog read signal is "segmented" into bit cell periods and interpreted during these segments of time. The presence of a peak during the bit cell period represents a "1" bit, whereas the absence of a peak represents a "0" bit. The most common errors in detection occur when the bit cells are not correctly aligned with the analog pulse data. Timing recovery, then, adjusts the bit cell periods so that the peaks occur in the center of the bit cells on average in order to minimize detection errors. Since timing information is derived only when peaks are detected, the input data stream is normally run length limited (RLL) to limit the number of consecutive "0" bits. The input data stream is also frequently RLL encoded to limit the spacing of "1" bits so as to minimize the undesirable effect of inter-symbol interference (ISI).

An RLL code denoted (d,k) encodes the input data stream such that at least d "0" bits occur between each "1" bit and no more than k "0" bits occur consecutively. A typical RLL code is a rate 2/3 (1,7) code which encodes 2 input data bits into 3 codeword bits recorded on the disk. The user data to codeword rate (2/3 in this example) is an important factor in the overall storage capacity of the disk drive. As the rate approaches unity, more user data is stored to the disk rather than codeword data. However, the d=1 constraint allows a faster write frequency and thereby allows more codeword data to be written to the disk. In fact, in most cases a d=1 rate 2/3 code allows more user data to be stored on the disk than with d=0 at any rate assuming both systems use the same minimum distance between flux transitions on the disk.

Read channels that employ sampled amplitude sequence detection are more efficient than conventional peak detection read channels because they compensate for intersymbol interference (ISI) and, therefore, are less susceptible to noise caused by ISI. As a result, the linear track density can be increased for a given (d,k) constraint to achieve the same bit error rate as a peak detection read channel operating at a lower density. In partial response class-IV (PR4) sequence detection, a d=0 constraint is used in order to take advantage of this ISI compensation. Pulses representing consecutive "1" bits recorded in adjacent bit cells at a high density cannot be accurately detected using a conventional peak detector due to the resulting inter-symbol interference. However, a PR4 sequence detector anticipates the effect of ISI and is able to detect the correct binary sequence.

A common implementation of PR4 sequence detection is a pair of sliding threshold dicode detectors that operate on the even and odd interleaves of the data stream, respectively.

(See Roy D. Cideciyan, Francois Dolivo, Walter Hirt, and Wolfgang Schott, "A PRML System for Digital Magnetic Recording", *IEEE Journal on Selected Areas in Communications*, Vol. 10 No. 1, Jan. 1992, pp.38–56.) Various encoding technics have been employed to minimize the path memory of sliding threshold detectors. See, for instance, co-pending U.S. patent application Ser. No. 08/257,853 entitled, "Method and Apparatus for Detecting and Decoding Data In A PRML Class-IV Digital Communication Channel", the disclosure of which is hereby incorporated by reference.

There are known methods in the prior art for detecting servo track addresses using a PR4 sequence detector in a sampled amplitude read channel (see e.g., U.S. Pat. No. 5,384,671 entitled, "PRML Sampled Data Channel Synchronous Servo Detector", the disclosure of which is hereby incorporated by reference.) In the '671 patent, a rate 1/3 encoder encodes the track address where a "0" bit is encoded into "110" and a "1" bit is encoded into "011" Although this encoding scheme is sufficient to minimize the path memory of a sliding threshold PR4 detector, the 1/3 code rate is highly inefficient.

What is needed is an efficient (i.e., rate greater than 1/3) Gray code encoding scheme for encoding servo track addresses so as to be compatible with PR4 sequence detection while minimizing the cost of the servo address decoder.

SUMMARY OF THE INVENTION

The present invention increases the data density of a magnetic disk storage system using a cost effective implementation for encoding, detecting, and decoding servo track addresses in a PR4 magnetic disk drive. An optimum rate 5/7 RLL (0,k) code encodes Gray code track addresses into channel data that is recorded onto the magnetic disk. During read back, a PR4 Viterbi sequence detector detects the servo data, and an RLL (0,k) decoder decodes the channel data back into the Gray code track address. By compensating for inter-symbol interference, the Viterbi sequence detector increases the signal to noise and thereby the data density. Further, it is more cost effective to use the Viterbi detector to detect the servo data since it is already incorporated into the read channel for detecting user data.

In operation, a 1+D filter encodes a 15 bit binary representation of the track address into a 15 bit Gray code. An RLL (0,k) encoder encodes the 15 bit Gray code into a 21 bit servo track address that is recorded onto the disk. Upon read back, a PR4 sequence detector, such as a Viterbi sequence detector, detects the recorded servo data, and an RLL (0,k) decoder decodes the 21 bit servo track address back into the corresponding 15 bit Gray code. Then, a 1/(1+D) filter converts the 15 bit Gray code back into the corresponding 15 bit binary track address. A servo controller subtracts the decoded binary track address from a target track address to generate a position error for controlling the velocity of the read/write head as it approaches the selected track.

The two design criteria of the present invention are: to maximize the user data density; and to minimize the RLL (0,k) servo decoder's complexity and cost. Encoding the Gray code address using an efficient code rate and detecting the servo data with a Viterbi sequence detector achieves the first criteria, while decoding the RLL (0,k) codeword in a predetermined number of sections achieves the second criteria.

For PR4 sequence detection, the optimal code rate is 5/7; 5 bits of Gray code track address are encoded into 7 bits of RLL (0,k) encoded servo track address. More than 5 Gray code bits can be encoded at a time to achieve a code rate better than 5/7, but the resulting improvement in data density does not outweigh the increased cost in decoder complexity. Also, it is not possible to achieve a code rate greater than 5/7 by encoding less than 5 Gray code bits at a time. The 5/7 limitation is due to the inherent requirement that the channel data of adjacent track addresses differ in only two adjacent bits and the need to minimize the memory in the sliding threshold PR4 sequence detector.

In order to reduce the complexity of the RLL (0,k) servo decoder, a 21 bit RLL (0,k) codeword representing the servo track address is decoded in three sections where each section comprises 7 bits each. The three 7 bit codeword sections are decoded into three 5 bit Gray code sections which are concatenated into a 15 bit Gray code. In this manner, a single RLL decoder can decode each 7 bits of codeword into 5 bits of Gray code rather than decoding 21 bits of codeword into 15 bits of Gray code, thereby reducing the complexity and cost of the decoder.

The above, and other advantages of the present invention will be understood from the following detailed description of the preferred embodiment and accompanying illustrative drawings wherein like numerals refer to similar parts in the several views.

BRIEF DESCRIPTION OF THE DRAWINGS

FIG. 3 shows a prior art RLL (0,k) method for encoding track address into channel data for detection using a PR4 sequence detector.

FIG. 4 shows the preferred embodiment for RLL (0,k) coding the track address into channel data at rate 5/7.

FIG. 6 shows the intermediate step of encoding the binary track address into a Gray code such that only one of three 5 bit sections of the track address changes between adjacent track addresses.

DETAILED DESCRIPTION OF THE DRAWINGS

Figure 1A:
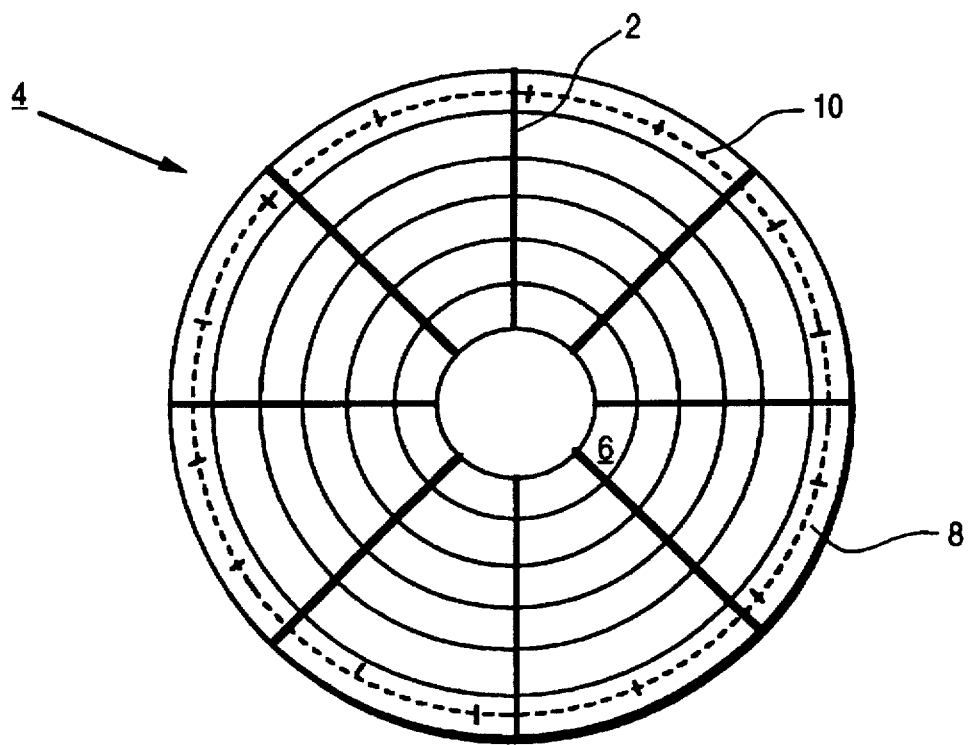
FIGS. 1A and 1B show a conventional magnetic disk data format comprised of a plurality of concentric data tracks having embedded servo data in the form of radial spokes.
Figure 1B:
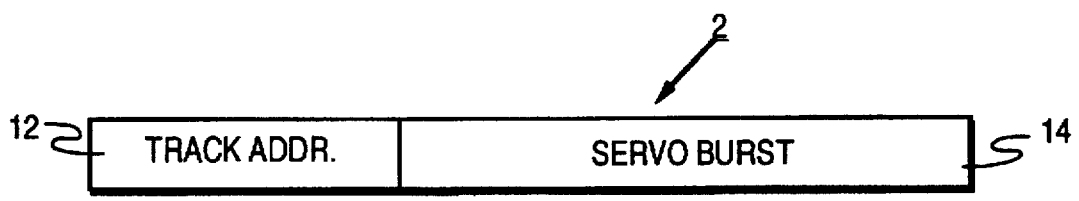

FIGS. 1A and 1B show an exemplary data format of a magnetic disk 4 comprising a plurality of concentric data tracks from an inner track 6 to an outer track 8. Each data track comprises a plurality of sectors 10 having a plurality of servo fields 2 embedded therein. A servo controller processes the servo field 2 to verify the track address 12 of a read/write head in order to position the head over a selected track. Once the read/write head reaches the selected track, the servo controller processes servo bursts 14 within the servo field 2 to keep the head aligned over the track's centerline while writing and reading data.

Figure 2:
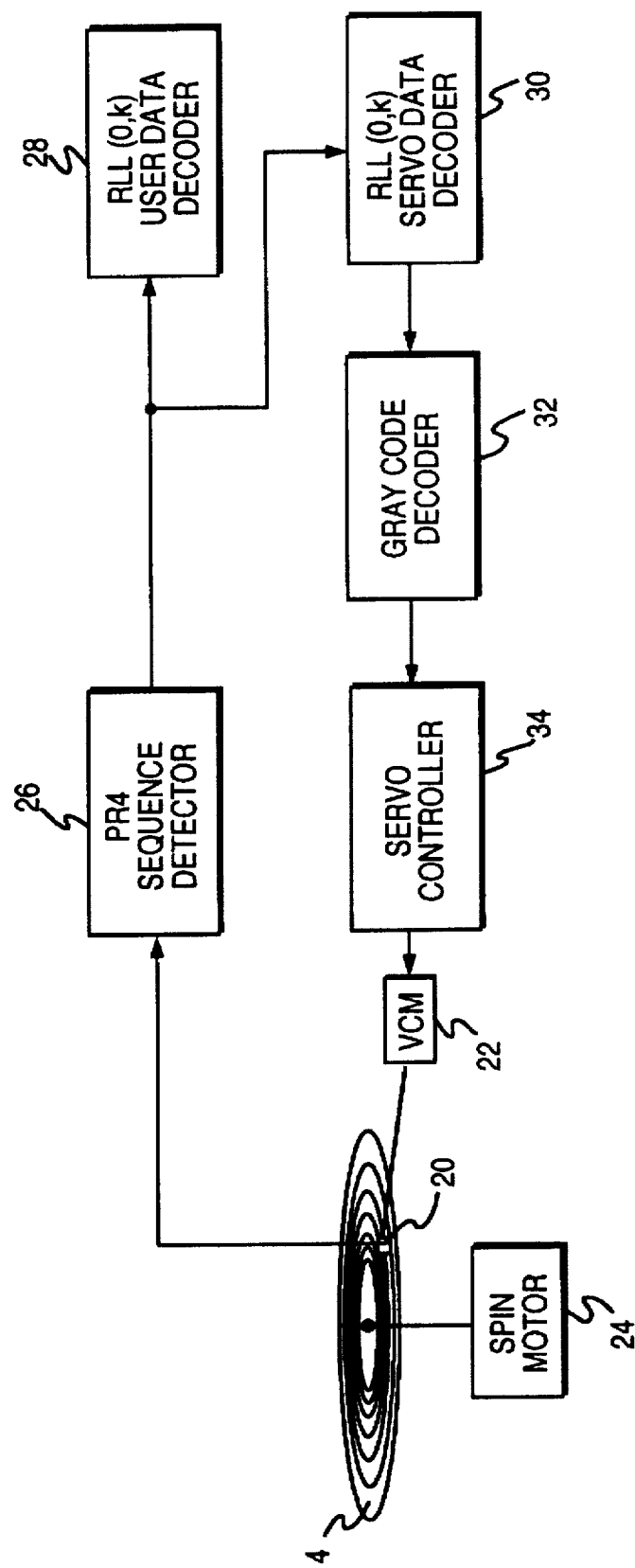
FIG. 2 is a block diagram of the read channel incorporating a PR4 sequence detector, a first RLL (0,k) decoder for decoding user data, and a second RLL (0,k) decoder for decoding servo data.

FIG. 2 is a block diagram of the magnetic storage system of the present invention. The magnetic disk 4, with the servo data recorded thereon, has a read/write head 20 positioned over its surface by means of a voice coil motor (VCM) 22 and is rotated at a very high speed by means of a spin motor 24. A PR4 sequence detector 26, responsive to the read signal from the read/write head 20, detects and outputs the decoded binary user data and servo data recorded on the disk. In the preferred embodiment, the PR4 sequence detector 26 is a Viterbi type sequence detector such as the one disclosed by Zook in the above referenced co-pending U.S. patent application Ser. No. 08/257,853. A first d=0 decoder 28 decodes the user data, and a second d=0 decoder 30 decodes the servo data into Gray coded track addresses. A Gray decoder 32 decodes the Gray code track address into the corresponding binary track address which is then transmitted to a servo controller 34. The servo controller subtracts the binary track address from a target track address to generate a VCM 22 command signal for controlling the velocity of the read/write head 20 as it moves toward the target track.

Referring now to FIG. 3, shown is the track address encoding method disclosed in the above referenced prior art U.S. Pat. No. 5,384,671 entitled, "PRML Sampled Data Channel Synchronous Servo Detector." In the '671 patent, a "0" bit is encoded into "110" and a "1" bit is encoded into a "011" before PR4 precoding, $1/1-D^2$. This encoding scheme constrains the maximum number of consecutive zeros in the even and odd interleaves in order to minimize the path memory of the PR4 sliding threshold sequence detector. However, this encoding scheme is rate 1/3 which is highly inefficient.

In the present invention, a Gray code encodes the binary servo track addresses so that detection errors are avoided even when the head is between tracks. In order to increase the code rate, the encoding method encodes multiple bits of the Gray code (rather than one bit at a time) into the channel data recorded on the disk. The channel encoding scheme is constructed according to the following constraints:

1. The channel codewords representing adjacent track addresses must be different by only two adjacent bits.

2. The channel codewords must cause the path memories of the sliding threshold PR4 sequence detector to merge within a predetermined number of bits.

3. The set of channel codewords must not contain complements. The first constraint is satisfied by encoding the Gray code track addresses into channel codewords that differ by two adjacent bits. The second constraint is satisfied by selecting codewords that ensure a non-zero sample is processed by the sliding threshold detectors within the predetermined number of bits. The third constraint is satisfied by selecting a set of codewords that does not contain the complement of any codeword in the set. This is accomplished in the preferred embodiment by selecting an odd codeword length and allowing each codeword to have an odd number of "1" bits. In this manner, the complement of any codeword has an even number of "1" bits and hence would not be in the codeword set.

Additionally, the third constraint prevents the PR4 detector from detecting the same sequence of bits for two codewords in the set due to the (1+D) polynomial. Since a codeword is complemented by XORing it with a sequence of all "1" bits, and since a sequence of all "1" bits will be detected as a sequence of all "0" bits at the output of a PR4 detector, then a PR4 detector will output the same sequence for a codeword and its complement.

The optimum code satisfying the above constraints is shown in FIG. 4. The first column is the binary track address that is subtracted from the target track address to generate the servo control signal. The second column is the Gray code representation of the binary track address, and the third column is the encoded channel data track address actually recorded to the disk (NRZI data). The fourth column shows the magnetic flux transitions on the disk corresponding to the "1" bits of the channel data track address. The fifth column shows the output of a PR4 detector, that is, the data obtained by passing the channel codewords of column three through a (1+D) filter.

The most significant bit in the fifth column is denoted with an x to indicate either a "0" or a "1" depending on the value of the bit preceding the codeword. The most significant bit of the PR4 codeword is a redundancy bit that is unnecessary to accurately decode the servo track address because the least significant six bits are unique. That is, the RLL (0,k) servo data decoder 30 of FIG. 2 decodes only the least significant six bits of the seven bit codeword. The most significant bit is ignored.

If the binary track address contains five bits, as shown in the first column of FIG. 4, then it is unnecessary to encode the track address into a Gray code and then into the channel data; the binary track address can be encoded directly into the channel data of column three. The intermediate step of encoding the binary track address of column one into the Gray code of column two is necessary when the binary track address comprises more than five bits in which case the binary track address is processed in segments of 5 bits as discussed in further detail bellow.

The code in FIG. 4 satisfies an RLL constraint of (0,4) and has a rate of 5/7 (5 bits of Gray code encode into 7 bit codewords). For PR4 recording, it is not possible to encode fewer than 5 bits of Gray code and achieve a code rate of 5/7 or better. And even though possible to achieve a code rate better than 5/7 by encoding more than 5 bits of the Gray code track address, the marginal increase in the code rate does not outweigh the resulting increase in decoder complexity and cost.

Figure 5:
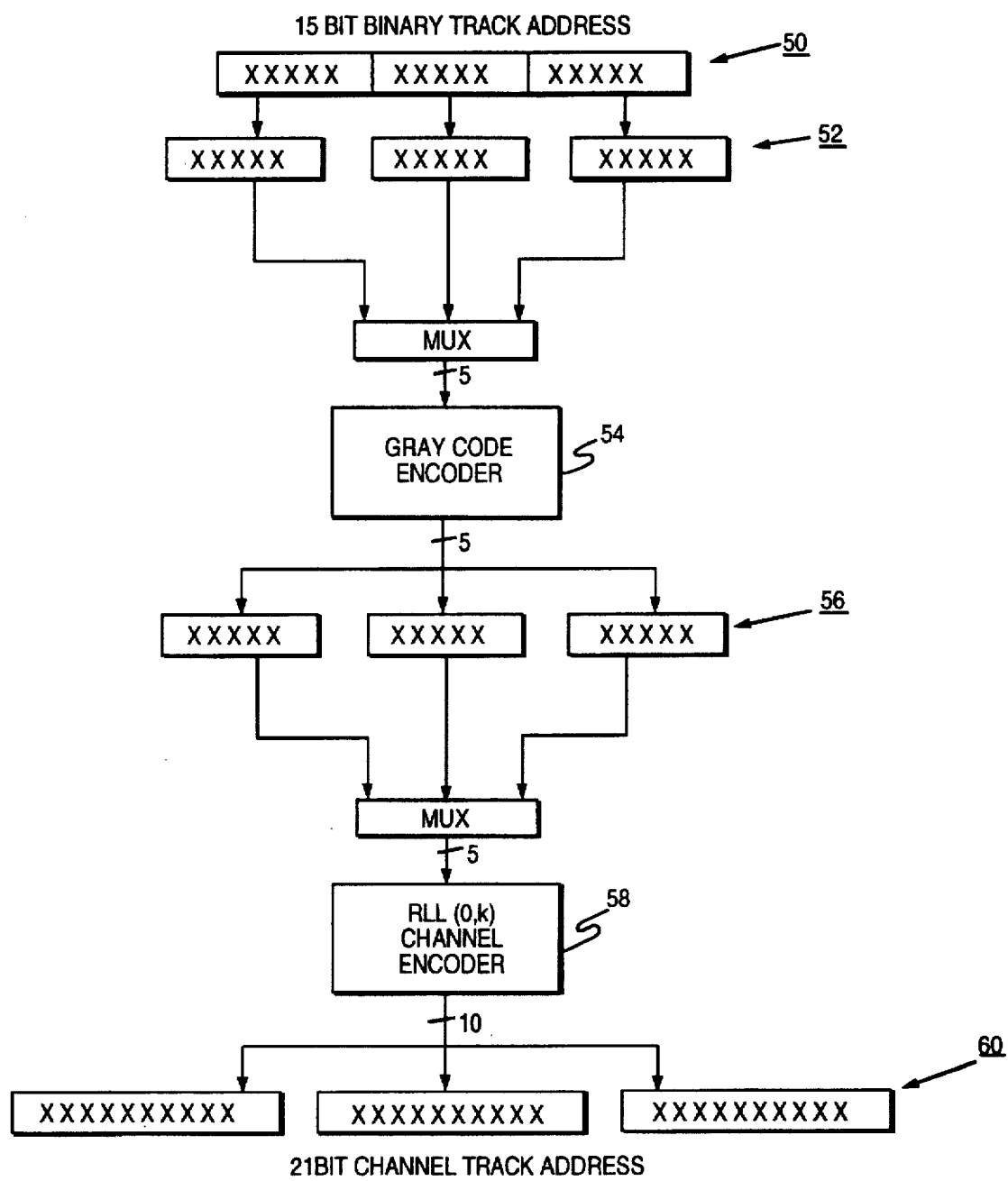
FIG. 5 illustrates a method for encoding the track address in three sections.

The encoding method of the present invention is further understood with reference to FIG. 5 For this example, a 15 bit binary track address 50 is segmented into three five bit sections 52. A Gray code encoder 54 sequentially encodes each five bit section 52 into a corresponding five bit Gray code 56. Then, a RLL(0,k) channel encoder 58 sequentially encodes each of the five bit Gray codes 56 into a corresponding 7 bit codeword 60. The three 7 bit codewords 60 represent a 21 bit servo track address recorded to the disk.

The intermediate step of encoding the binary track address 50 into a Gray code 56 ensures that only one of the three codeword sections 60 changes between adjacent track addresses. This is necessary to satisfy the above first constraint—to ensure that the channel codewords of adjacent track addresses are different by only two adjacent bits. Since more than one of the three binary track address sections 52 can change between adjacent track addresses (e.g., #31 =00000 00000 11111 and #32 =00000 00001 00000) the binary track address 52 cannot be encoded directly into the 21 bit channel track address 60. Instead, the three sections 52 of the binary track address 50 are first encoded into three Gray code sections 56 where only one of the Gray code sections changes between adjacent track address.

This is illustrated in FIG. 6 which shows a first column representing the binary track address and a second column representing the corresponding Gray code. The first 32 binary track addresses are encoded according to FIG. 4; the third Gray code column 62 in FIG. 6 represents the Gray code in the second column of FIG. 4. At the 33rd binary track address 64, the third Gray code column 62 (10000)

does not change while the second column 66 changes from 00000 to 00001, the second Gray code in column two of FIG. 4. At the 34th binary track address 68, the second Gray code column 66 does not change while the third column 62 changes from 10000 to 10001, the second to last Gray code in column two of FIG. 4. The third Gray code column 62 sequences in reverse through the Gray codes in column two of FIG. 4 until the 65th binary track address 70. Again, the third Gray code column 62 (00000) does not change while the second column 66 changes from 00001 to 00011, the third Gray code in column two of FIG. 4. For the next 32 binary track addresses, the third Gray code column 62 again sequences through the Gray codes in the second column of FIG. 4. Each column of the Gray code in FIG. 6 sequences through the Gray codes in FIG. 4 in a similar manner. As a result, only one of the Gray code columns changes between adjacent track addresses, ensuring that only one of the 10 bit codewords 60 recorded to the disk changes between adjacent track addresses. Also, since each column progresses through the same sequence, the same encoder can encode all three sections. This is true even though the columns progress through the sequence at different rates.

Figure 7:
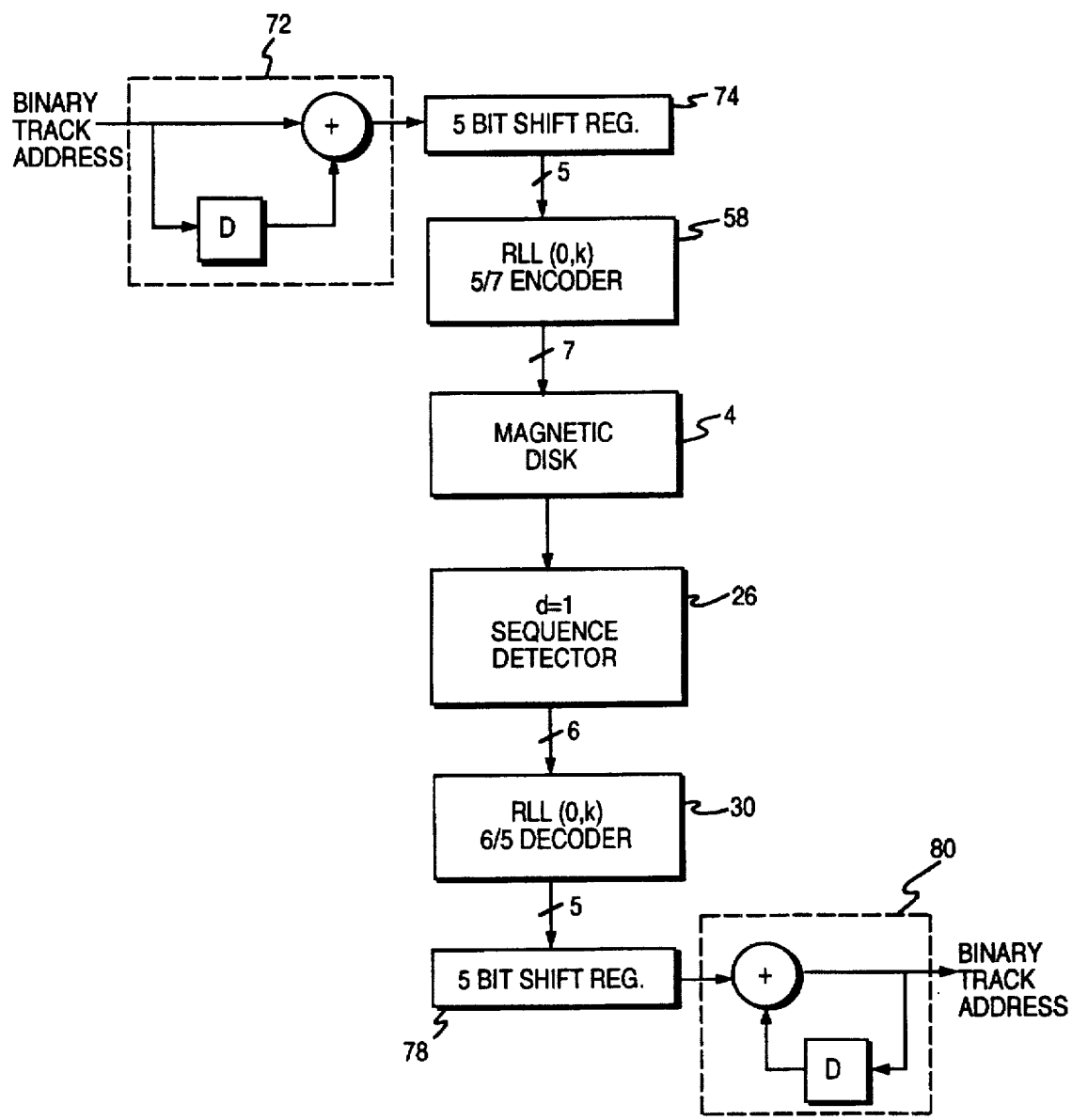
FIG. 7 shows the preferred embodiment of the present invention for encoding, detecting, and decoding the track address.

The preferred embodiment for encoding, detecting, and decoding a 15 bit binary track address is shown in FIG. 7. A 1+D filter 72 filters the binary track address to encode it into the Gray code shown in FIGS. 4–6. The filtered address (Gray code) is shifted into a 5 bit shift register 74, and after five bits, the register's output is encoded, by a 5/7 RLL (0,k) encoder 58, into a corresponding 7 bit codeword shown in column three of FIG. 4. The codeword is recorded to the disk 4 and this process repeats for the three five bit sections of each track address.

Upon read back, the codewords recorded on the disk 4 are detected using a PR4 sequence detector 26 (and preferably a Viterbi sequence detector) and decoded, by a 6/5 RLL (0,k) decoder 30, back into the Gray code representation. The most significant bit of the 7 bit channel code is unused in the decoding process. The five bit output of decoder 30 is loaded into a five bit shift register 78 and shifted out serially. The output of shift register 78 is passed through a 1/(1+D) filter 80 to decode the Gray code back into the corresponding binary track address.

The system of FIG. 7 is efficient and cost effective. The 1+D filter 72 and the 1/(1+D) filter 80 are implemented with a modulo two adder and a one bit delay register. Because the track address is processed in three sections of five bits each, the complexity and cost of the 6/5 RLL (1,k) decoder 30 has been reduced. Thus, the present invention increases the data density of the storage system by detecting the track address with a PR4 sequence detector 26 and decoding the same with a cost effective RLL(0,k) 6/5 decoder 30.

Many changes in form and detail could be made without departing from the spirit and scope of the present invention; the particular embodiment disclosed herein is not intended to be limiting. The scope of the invention is properly construed from the following claims.

We claim:

1. In a PR4 read channel for reading data stored on a magnetic medium by detecting digital data from a sequence of discrete time sample values generated by sampling pulses in an analog signal from a magnetic read head positioned over the magnetic medium, wherein a PR4 sequence detector responsive to the discrete time sample values detects a plurality of codewords representing recorded servo track addresses, a servo data decoder for decoding the plurality of codewords into corresponding decoded track addresses, wherein:

(a) codewords representing adjacent track addresses differ by only two adjacent bits;

(b) the plurality of codewords does not contain complements; and (c) a ratio m/n of a number of bits m in a decoded track address to a number of bits n in a corresponding codeword is greater than 1/3.

2. The servo data decoder as recited in claim 1, wherein:

(a) the PR4 sequence detector comprises a first and second sliding threshold Viterbi detector for processing the even and odd interleaves of the sequence of discrete time sample values, respectively; and (b) the plurality of codewords ensures that the first and second sliding threshold Viterbi detector will processes a non-zero sample within a predetermined number of samples.

3. The servo data decoder as recited in claim 1, wherein each codeword comprise at least one redundancy bit not used by the servo data decoder.

4. The servo data decoder as recited in claim 1, wherein m/n is equal to 5/7.

5. The servo data decoder as recited in claim 1, wherein:

(a) the decoder parallel decodes each codeword in a predetermined number of sections;

(b) each section comprises more than three bits; and (c) each section decodes into more than two bits of a corresponding decoded track address.

6. The servo data decoder as recited in claim 5, wherein:

(a) the decoded track address is a 15 bit Gray code;

(b) each codeword comprises 21 bits;

(c) each codeword is decoded in three 7 bit sections; and (d) each 7 bit section is decoded into 5 bits of the corresponding Gray code.

7. The servo data decoder as recited in claim 1, wherein:

(a) each codeword is decoded into a Gray code; and (b) a 1/1+D filter decodes the Gray code into a binary track address.

* * * * *

UNITED STATES PATENT AND TRADEMARK OFFICE
CERTIFICATE OF CORRECTION

PATENT NO : 5,737,142
DATED : April 7, 1998
INVENTOR(S) : Zook

It is certified that error appears in the above-identified patent and that said Letters Patent is hereby corrected as shown below:

In the drawings, Sheet 5, FIG. 5, the label "10" on the output line of the "RLL (0,k) CHANNEL ENCODER" 58 should be labeled "7".

In the drawings, Sheet 5, FIG. 5, the segments labelled "X X X X X X X X X X" 60 of the 21 BIT CHANNEL TRACK ADDRESS should be labeled --X X X X X X X--.

In the drawings, Sheet 7, FIG. 7, the element "d=1 SEQUENCE DETECTOR" 26 should be labelled --PR4 SEQUENCE DETECTOR--.

Signed and Sealed this

Twenty-first Day of July, 1998

*Attest:*

BRUCE LEHMAN

*Attesting Officer*      *Commissioner of Patents and Trademarks*